July 20, 1948.   R. G. HEITZ ET AL   2,445,526
DISTILLATION OF HEXACHLORETHANE
Filed Oct. 10, 1944   2 Sheets-Sheet 1

INVENTORS
Robert G. Heitz
Charles F. Oldershaw
BY
ATTORNEY

July 20, 1948. R. G. HEITZ ET AL 2,445,526
DISTILLATION OF HEXACHLORETHANE
Filed Oct. 10, 1944 2 Sheets-Sheet 2

INVENTORS
Robert G. Heitz
Charles F. Oldershaw
BY
Robert N. Bennoff
ATTORNEY

Patented July 20, 1948

2,445,526

UNITED STATES PATENT OFFICE 2,445,526

DISTILLATION OF HEXACHLORETHANE

Robert G. Heitz, Antioch, and Charles F. Oldershaw, Concord, Calif., assignors to The Dow Chemical Company, Midland, Mich., a corporation of Michigan Application October 10, 1944, Serial No. 558,071

3 Claims. (Cl. 202—51)

1

This invention relates to improvements in the purification of hexachlorethane. It is more particularly concerned with the separation of hexachlorethane from the reaction mixture resulting from the process of preparing the same and its recovery in purified form, although the invention may also be applied to the treatment of impure or contaminated hexachlorethane from any source.

Hexachlorethane is usually prepared by chlorinating perchlorethylene or a partially chlorinated ethane, such as tetra- or penta-chlorethane, or mixtures thereof. In such chlorination the liquid lower chlorinated compound serves as a solvent for the hexachlorethane as it is produced, and the chlorination is discontinued at a point whereat sufficient unchlorinated solvent remains to hold the hexachlorethane largely in solution at the operating temperature. Heretofore the separation of the hexachlorethane from the reaction mixture has been carried out in various ways. According to one procedure the reaction mixture is cooled to a sufficiently low temperature to crystallize a substantial proportion of the hexachlorethane product, after which the crystals are filtered from the mother liquor, washed to remove adhering mother liquor and dried. This procedure is unsatisfactory for large scale commercial operations for the reason that the crystals are difficult to filter and wash clean from mother liquor and then to dry without caking. These operations require an excessive amount of manual handling, and involve as well losses of product by vaporization.

Another procedure, which aims to avoid some of the aforesaid difficulties, has been to distill the reaction mixture to remove the solvent, leaving behind a residue of hexachlorethane, which is then purified further, if desired, by sublimation. Such distillation must be carried out in costly apparatus which is glass lined or constructed of corrosion-resistant steel in order to avoid excessive contamination of the product by metallic impurities. The sublimation is slow and costly, and not adapted to yield a subdivided product directly. If such a product is desired, the sublimed material must be ground or otherwise comminuted, for which its waxy character is poorly suited. The distillation procedure of purification, when carried out at normal or reduced pressure, is also disadvantageous for the reason that a substantial amount of hexachlorethane vaporizes along with the solvent and is practically recoverable only indirectly by returning the distilled solvent containing some hexachlorethane to the chlorination process.

The invention is directed to an improved method for purifying hexachlorethane which overcomes or avoids the difficulties inherent in the prior art methods. The object of the invention is to provide a method which (1) avoids the necessity for filtering a crystal slurry, or of subliming a mass of more or less impure material; (2) yields a product of high purity without requiring the use of unduly costly construction materials for the apparatus; (3) can be carried on continuously; and (4) delivers a subdivided product such as is generally preferred by the trade. The foregoing and other objects and advantages of the invention are attained by the improved method which is fully described in the following specification and illustrated in the accompanying drawings.

In the drawings, Figure 1 is a diagrammatic representation of a form of apparatus for carrying out the method of the invention.

Figure 1:
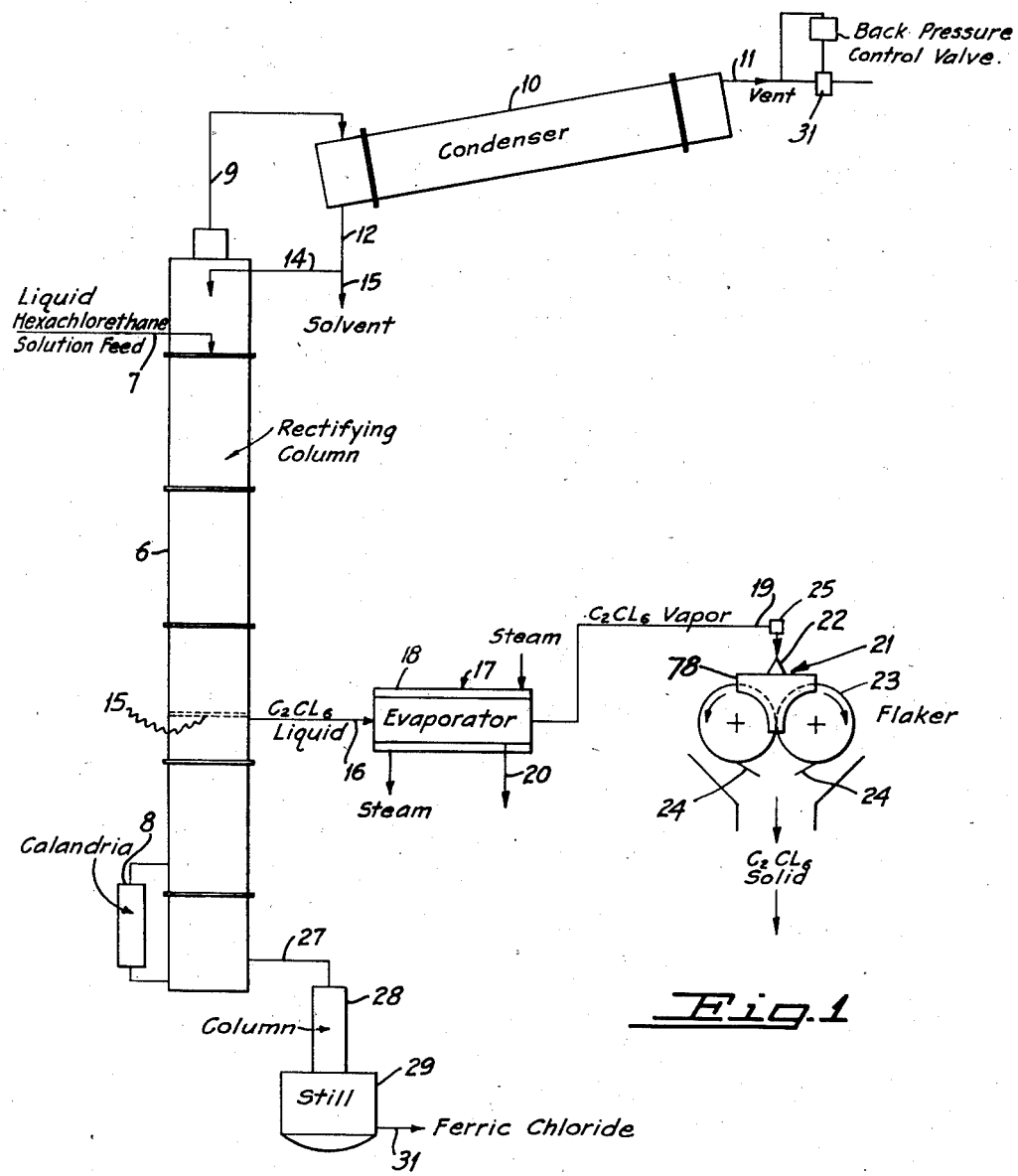

It is known that hexachlorethane, which has a melting point of about 185°–186° C., sublimes without boiling at substantially the same temperature. Hence it cannot be distilled at normal atmospheric pressure, although at moderately increased pressures it can be liquefied and vaporized readily. We have utilized this characteristic of hexachlorethane in developing our improved method. According to our invention a solution of hexachlorethane in a volatile solvent, such as carbon tetrachloride, or a reaction mixture of the type above mentioned, is fed to a fractionating column in which it is fractionally distilled under a moderate superatmospheric pressure sufficient to prevent formation of a solid phase of hexachlorethane in the solvent. The pressure employed should be sufficient to maintain the hexachlorethane in a liquid state in all concentrations of the hexachlorethane in the solvent during the distillation. The solvent vapors are taken off as the overhead fraction, while the solvent-free liquid hexachlorethane, which collects in the lower part of the column, is taken off as a liquid side-stream. To convert the liquid into a subdivided solid the side-stream is passed without release of pressure into an evaporator where the liquid is vaporized. The vapors are passed to a condenser in which they are brought into contact with a chilled surface to condense a layer of the solid material thereon. By moving the condenser surfaces at a rate such that only a thin solid layer is formed thereon and scraping off the layer to expose constantly uncoated areas to contact with the vapors, the rate of condensation by heat removal is maintained and the hexachlorethane is continuously removed as thin plates or flakes which are friable and crumble readily. The vapors passing from the vaporizer to the condenser are throttled in such manner that they are released to atmospheric pressure just before they impinge upon the condenser surface.

The method as described may be carried out in apparatus constructed of usual metals, such as carbon steel, with no substantial corrosion of the apparatus. Such traces of iron compounds which may be taken up by the liquid, and which might otherwise cause contamination and discoloration of the solid product, are separated in large part by the vaporization of the material in the process, being left as a residue which is allowed to accumulate in the still and vaporizer until in sufficient amount to be removed.

Refering to the drawing, a relatively large column is provided and is indicated at 6. Generally the column is packed but a plate column can be used if the plates are free draining so as to avoid hexachlorethane forming on them as a solid when the column is shut down. The incoming liquid stream of solvent and hexachlorethane is discharged into the column through inlet 7 below the top of the packing. A calandria, generally indicated at 8, is provided at the base of the column to volatilize any solvent which reaches the base of the column and to provide a reflux. A vaporized solvent stream is taken off from the top of the column through line 9 and is introduced into a suitable condenser 10 provided with a back pressure control valve 31 which maintains the required pressure on the system. The valve releases fixed gases such as hydrogen chloride and chlorine but only at a rate commensurate with maintenance of the pressure in the system. Liquid forming in the condenser is removed through line 12, a portion being returned to the top of the column through line 14 for reflux while some of the liquid is removed for re-use in the hexachlorethane manufacturing operation through line 15.

Liquid hexachlorethane is collected on a tray 15 in the lower portion of the column and is taken off through line 16. This liquid product can be run into any suitable cooling equipment and formed into a solid of any desired shape, size and weight as the product. We prefer, however, to vaporize it and so rid it of an additional quantity of iron which the hexachlorethane inevitably picks up when manufactured, handled and purified in iron or carbon steel equipment. Accordingly, the liquid is fed into an evaporator indicated at 17. The evaporator includes a jacket 18 through which a heating medium is circulated to heat the hexachlorethane liquid to a temperature whereat it vaporizes readily, leaving behind iron compounds of higher boiling point which collect in the evaporator and are removed periodically through line 20.

The hexachlorethane vapor from the evaporator is introduced through line 19 and valve 25 into a suitable condensing apparatus generally indicated by numeral 21 and which is presently described in detail in connection with Figures 2–5. This apparatus includes a vapor chest 22 feeding material to chilled drums 23. The material crystallizes on the drums and is scraped off and removed in flake form by blades 24. The vapor chest is heated to ensure that the hexachlorethane condenses only on the chilled drums and not upon the vapor chest nor on any other stationary element in the condenser-flaker.

The entire system is maintained under sufficient pressure by valves 25 and 31 to provide hexachlorethane as liquid until released in the vapor chest 22 onto the chilled drums to condense as a solid. The pressure employed depends upon the solvent or solvents present. For pure carbon tetrachloride the minimum pressure required to prevent solidification of hexachlorethane is about 7 pounds gauge at about 55 to 60 mol per cent hexachlorethane. To prevent the formation of local solid masses of hexachlorethane due to temporary local variations in column temperatures, we find it desirable to operate at a pressure about two pounds higher, about 9 pounds gauge or 24 pounds absolute.

Material collecting in the base of still 6 can be drained off through line 27 or passed to the top of a column 28 provided on still 29. This still is heated to vaporize hexachlorethane from any material having a boiling point much above that of hexachlorethane such as ferric chloride which collects in the bottom of the still and is removed through line 31. If one operates by draining off the material which collects in the bottom of the still through line 27, the loss of some hexachlorethane results. The use of still 29 minimizes this.

We have previously referred to the condensing apparatus generally indicated by numeral 21 in Figure 1. The specific apparatus employed is shown in greater detail in Figures 2, 3, 4 and 5 and includes a suitable frame indicated generally at 61 made up of suitable structural elements, including opposite parallel I-beams 62. Journals 63 are mounted in pairs on each of the I-beams to provide support for shafts 64 and 65 which support the rolls 23 for rotation. The journals are so mounted upon the frame that the drum peripheries engage one another in a tight, wiping contact, as appears in Figure 3. The reason for this will be explained presently.

Figure 5:
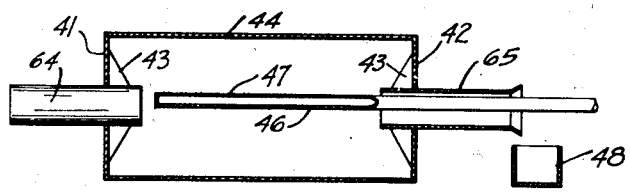
Figure 5 is a side elevation partly in section showing the construction employed to enable the condensing rolls to be chilled.
Figure 2:
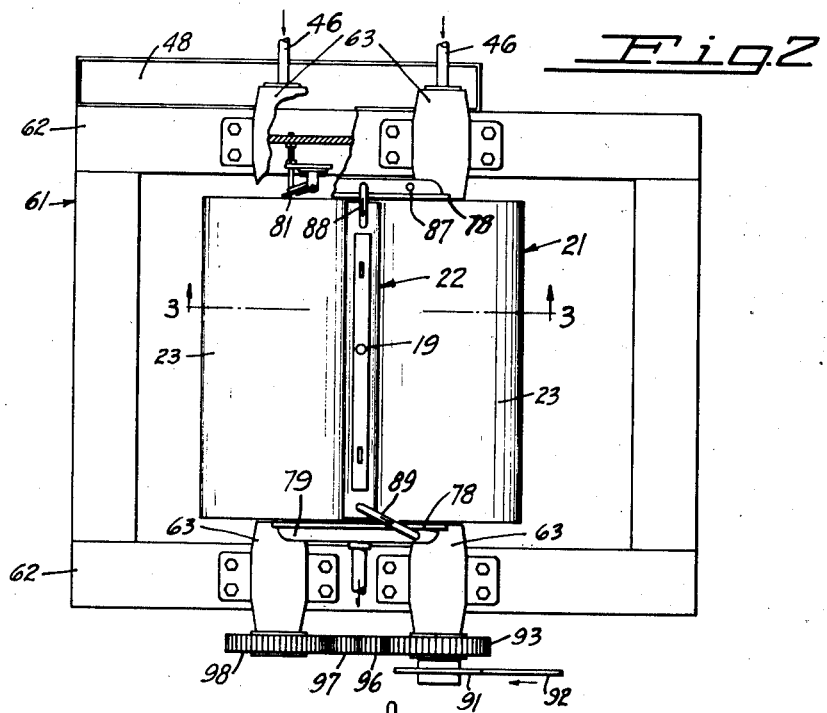
Figure 2 is a plan view, partly in section, of an apparatus for condensing the hexachlorethane and providing a finely divided, flaked product.

As appears best in Figure 5, each drum is made up of two annular ends 41 and 42 joined to shafts 64 and 65 respectively intermediate the shaft ends. Braces 43 are joined to the shafts and to each end to stiffen the ends. A drum sheet 44 is secured to the ends 41 and 42 to complete the drum. Each shaft 64 is made of a solid bar while each shaft 65 is tubular to permit a cold water pipe 46 to be inserted into the drum. This pipe includes a plurality of outlets 47 positioned to spray cold water onto the upper portions of the drum. Water in the drum drains out through shaft 65 into a drain box 48.

Figure 3:
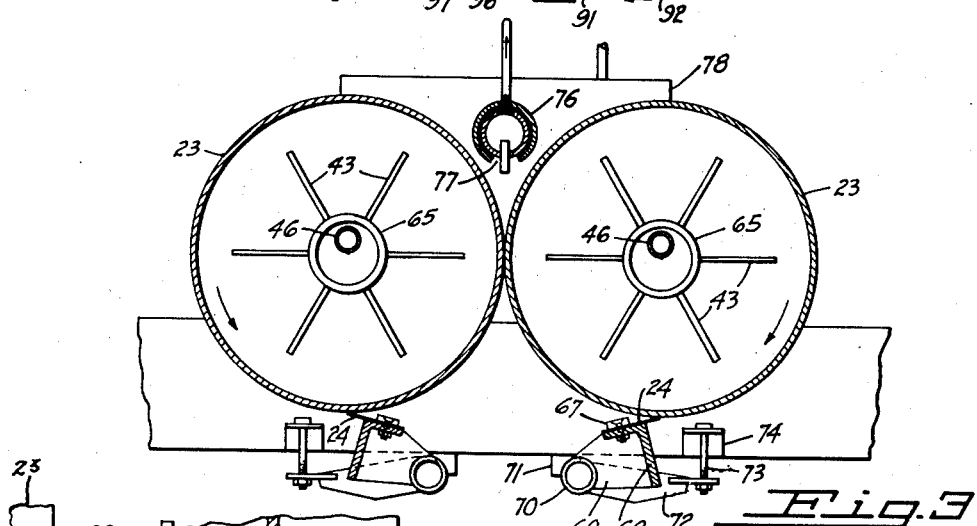
Figure 3 is a section taken along line 3—3 of Figure 2.
Figure 4:
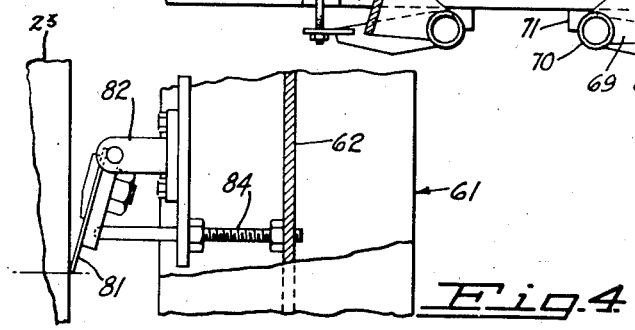
Figure 4 is a fragmentary view illustrating a scraper construction.

The material which collects on the drums is cut off in flake form by scraper blades 24 positioned beneath the drums as appears in Figure 3. Each blade is secured by studs 67 along one side of a length of angle iron 68, which are in turn supported upon gussets 69. Each gusset is secured to a stub shaft 70 mounted in a bearing 71 on frame 62. An arm 72 extends from each stub shaft 70 and is supported by a bolt 73 from a clip 74 secured to frame 62. The bolt provides a convenient means for adjusting the contact between the scraper blade 24 and the surface of the cooperating drum.

Hexachlorethane vapor is discharged between the drums from an outlet header 76 which extends across between the drums, the header including a plurality of jet outlets 77 which direct the hexachlorethane vapor down between the drums. The wiping contact of the drums confines the discharge vapor and does not permit the vapor to pass down below the rolls. As will presently appear, the drums rotate so that they advance from contact with the blades toward the hexachlorethane vapor discharge; this ensures a maximum period of residence on the drums so the hexachlorethane is completely chilled and can be removed from the drum in a friable, flaked form.

To minimize the quantity of hexachlorethane which might otherwise condense on the ends of the chilled drums, arcuate plates 78 are positioned close to the upper portion of the drum ends. The plates also extend above the drums to confine the space into which the vapor is released. The back of each plate is provided with a chest 79 to which a suitable heating medium is supplied to maintain the plates 78 at a temperature at which the hexachlorethane will condense on the cold drum ends and will not condense on the plates or any portion of frame 62. Auxiliary scraper blades 81 are also mounted in support brackets 82 on the side of the frame below shafts 64 and 65, the scrapers being held in against the end of the adjacent drum by threaded rods 84. Any hexachlorethane which condenses on the ends of the drums is scraped off and collects with the products removed by scraper blades 24.

To ensure that the hexachlorethane remains above its melting point and in vapor form until it is released from jets 77, jacket 86 is provided about the header 76. A suitable heating medium such as steam or dowtherm is supplied by pipe 87 to chest 79 on one side of the machine; from this it passes through pipe 88 to one end of the header 76; pipe 89 conducts the medium from the other end of the header to the other chest 79 from which it is suitably released.

To rotate the drums, a V-belt pulley 91 is placed upon one of the shafts 65, a V-belt 92 extending about the pulley to a suitable power source, not shown. The gear 93 positioned on the driven shaft 65 drives an idler gear 96 which is enmeshed with another idler gear 97. This idler engages gear 98 on the other shaft 65. The power supplied to the drive pulley 91 is such that the first driven drum rotates in a clockwise direction in Figure 2, while the other drum rotates in a counterclockwise direction.

As an operation typical of the present invention, a solution of hexachlorethane in carbon tetrachloride and small amounts of other chlorinated hydrocarbons such as chloroform and perchlorethylene and containing 33% hexachlorethane was fed to column 6 at the rate of 4000 pounds per hour. The column employed was thirty feet long. The calandria supplied sufficient heat to maintain a temperature of 210° C. in the liquid at a point several feet above plate 15 which was placed some ten feet above the bottom of the column. Liquid hexachlorethane, taken off through line 16 at a temperature of 210° C. and under a pressure of 9 pounds gauge, was substantially free of carbon tetrachloride and other chlorinated hydrocarbons. The liquid hexachlorethane was fed at the rate of 1,333 pounds per hour to the evaporator 17 wherein it was heated to a temperature just above 210° C. and passed as a vapor to condenser-flaker 21. The dry, solid, flaked product removed from the rolls 23 contained about 30 parts per million of iron and was of an acceptable commercial grade.

We claim:

1. A method of separating hexachlorethane in purified form from a solution of the same in a volatile solvent which comprises fractionally distilling the solution in a column to remove the solvent as overhead under a pressure of at least about 7 pounds gauge and at a temperature sufficient to maintain the hexachlorethane in a liquid state in all concentrations in the solvent in the distillation, withdrawing from a lower part of the column a liquid side-stream consisting substantially of hexachlorethane, vaporizing the liquid without releasing the pressure thereon to form a vapor stream, releasing the pressure on the vapor stream to substantially that of the atmosphere, and cooling the atmospheric pressure vapor stream to condense the hexachlorethane to a solid.

2. A method of separating hexachlorethane in purified form from a solution of the same in a volatile solvent which comprises fractionally distilling the solution in a column to remove the solvent as overhead under a pressure of about 9 pounds gauge and at a temperature sufficient to maintain the hexachlorethane in a liquid state in all concentrations in the solvent in the distillation, withdrawing from a lower part of the column a liquid side-stream consisting substantially of hexachlorethane, vaporizing the liquid without releasing the pressure thereon and condensing the vapors.

3. A method of producing hexachlorethane in purified form comprising heating hexachlorethane under a pressure of at least about 7 pounds gauge to provide a liquid body thereof, withdrawing continuously from said body a liquid stream of hexachlorethane, additionally heating said liquid stream without releasing the pressure thereon to vaporize the hexachlorethane and provide a stream of hexachlorethane vapor and to deposit any foreign solids entrained in the liquid stream, and condensing the vaporized hexachlorethane.

ROBERT G. HEITZ.
CHARLES F. OLDERSHAW.

REFERENCES CITED

The following references are of record in the file of this patent:

UNITED STATES PATENTS

| Number | Name | Date |
|---|---|---|
| 896,435 | Chute | Aug. 18, 1908 |
| 1,382,890 | Burrell et al. | June 28, 1921 |
| 1,445,004 | Coules | Feb. 13, 1923 |
| 1,468,377 | Crane et al. | Sept. 18, 1923 |
| 1,800,371 | Bartlett | Apr. 14, 1931 |
| 2,034,292 | Grebe et al. | Mar. 17, 1936 |
| 2,037,419 | Levine et al. | Apr. 14, 1936 |
| 2,204,364 | Kepfer | June 11, 1940 |
| 2,341,258 | Appel | Feb. 8, 1944 |